United States Patent
Saito et al.

(10) Patent No.: US 6,850,519 B1
(45) Date of Patent: Feb. 1, 2005

(54) COMMUNICATION NODE AND PACKET TRANSFER METHOD

(75) Inventors: Takeshi Saito, Tokyo (JP); Keiji Tsunoda, Kanagawa-ken (JP); Eiji Kamagata, Kanagawa-ken (JP); Noriyasu Kato, Kanagawa-ken (JP); Ichiro Tomoda, Tokyo (JP); Hirokazu Tanaka, Chiba-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/389,469

(22) Filed: Sep. 3, 1999

(30) Foreign Application Priority Data

Sep. 3, 1998 (JP) .......................................... P10-249859

(51) Int. Cl.[7] .............................................. H04L 12/56
(52) U.S. Cl. ...................................... 370/389; 370/466
(58) Field of Search ................................ 370/242, 252, 370/310, 310.1, 345, 349, 389, 395.52, 464, 466, 537; 714/4, 52, 752, 776, 799, 774; 709/228, 230; 455/101

(56) References Cited

U.S. PATENT DOCUMENTS

| | | | | |
|---|---|---|---|---|
| 5,717,689 A | * | 2/1998 | Ayanoglu | 370/349 |
| 5,825,430 A | * | 10/1998 | Adolph et al. | 348/487 |
| 5,844,918 A | * | 12/1998 | Kato | 714/751 |
| 5,852,631 A | * | 12/1998 | Scott | 375/222 |
| 6,085,252 A | * | 7/2000 | Zhu et al. | 348/474 |
| 6,105,068 A | * | 8/2000 | Naudus | 709/228 |
| 6,141,788 A | * | 10/2000 | Rosenberg et al. | 714/774 |
| 6,157,642 A | * | 12/2000 | Sturza et al. | 370/389 |
| 6,246,490 B1 | * | 6/2001 | Sebestyen | 358/425 |
| 6,405,338 B1 | * | 6/2002 | Sinha et al. | 714/752 |
| 6,490,705 B1 | * | 12/2002 | Boyce | 714/776 |
| 6,658,242 B1 | * | 12/2003 | Knutson et al. | 455/232.1 |
| 2001/0006512 A1 | * | 7/2001 | Takabatake et al. | 370/329 |
| 2001/0038650 A1 | * | 11/2001 | Park et al. | 370/537 |

FOREIGN PATENT DOCUMENTS

| | | |
|---|---|---|
| JP | 7-245600 | 9/1995 |
| JP | 8-265332 | 10/1996 |
| JP | 9-51337 | 2/1997 |
| JP | 9-191457 | 7/1997 |

OTHER PUBLICATIONS

Puri et al. "MPEG–4: An Object–based Multimedia Coding Standard supporting Mobile Applications". ACM Mobile Networks. Aug. 1997. pp. 1–51.*

(List continued on next page.)

*Primary Examiner*—Chi Pham
*Assistant Examiner*—Derrick W Ferris
(74) *Attorney, Agent, or Firm*—Oblon, Spivak, McClelland, Maier & Neustadt, P.C.

(57) ABSTRACT

A communication node which can reliably transfer a packet with a payload including data having error resistance in radio environments is disclosed. A packet to be transmitted is divided into segments to form a plurality of packet segments. From among a plurality of error correction schemes that have been prepared in advance, the scheme to be employed is selected for each of the packet segments in accordance with predetermined criteria, and the selected error correction scheme is applied to each packet segment. Subsequently, the processed packet segment is transmitted to the network. Packet segments are received from the network. From among a plurality of error correction schemes prepared in advance, the scheme to be employed is selected for each of the received packet segments based on predetermined information contained in each received packet segment, and the selected error correction scheme is applied to the received packet segment. An original packet is formed from the plurality of processed packet segments.

8 Claims, 13 Drawing Sheets

OTHER PUBLICATIONS

Talluri et al. "Error–Resilient Video Coding in the ISO MPEG–4 Standard". IEEE Communications Magazine. Jun. 1998. pp. 112–119.*

Wang et al. "Error Control and Concealment for Video Communication: A Review". IEEE. May 1998. pp. 974–997.*

Elaoud et al. "Adaptive Use of Error–Correcting Codes for Real–time Communication in Wireless Networks". IEEE Infocom. Mar. 29, 1998–Apr. 2, 1998. pp. 548–555.*

Gharavi et al. "Partitioning of MPEG Coded Video Bitstreams for Wireless Transmission". IEEE. Jun. 1997. pp. 153–155.*

* cited by examiner

| VALUE OF MC | PAYLOAD CONFIGURATION | ATTIRBUTES |
|---|---|---|
| 1 | DATA1 | APPLY FEC |
| 2 | DATA2 | RETRANSMIT CONTROL UPON THE OCCURRENCE OF ERROR |
| ⋮ | ⋮ | ⋮ |

*FIG. 7*

| | FEC CODE | FEC SCHEME | |
|---|---|---|---|
| FEC CORRESPONDENCE TABLE FOR DATA1 | 1 | FEC1 | WITH ERROR CORRECTION ABILITY CAPABLE OF REDUCING ERROR RATE OF 10-3 DOWN TO ZERO |
| | 2 | FEC2 | WITH ERROR CORRECTION ABILITY CAPABLE OF REDUCING ERROR RATE OF 10-3 DOWN TO ERROR RATE OF 10-6 |
| FEC CORRESPONDENCE TABLE FOR DATA2 | 1 | FEC3 | |
| | 2 | FEC4 | |

*FIG. 8*

| ATTRIBUTES (HIGHER-LEVEL LAYER PROTOCOL, FLOW, ETC.) | ERROR CONTROL SCHEME |
|---|---|
| TCP PROTOCOL | MC=1 (IST FRAGMENT)<br>MC=2 (2ND AND SUBSEQUENT FRAGMENTS) |
| UDP PROTOCOL | MC=1, FEC=1 (IST FRAGMENT)<br>MC=1, FEC=2 (2ND AND SUBSEQUENT FRAGMENTS) |

| VALUE OF MC | PAYLOAD CONFIGURATION | ATTIRBUTES |
|---|---|---|
| 1 | DATA1 | FEC=FEC1 |
| 2 | DATA2 | FEC=FEC2 |
| ⋮ | ⋮ | ⋮ |

COMMUNICATION NODE AND PACKET TRANSFER METHOD

CROSS REFERENCE TO RELATED APPLICATION

This application claims benefit of priority to Japanese Patent Application No. P10-249859 filed Sep. 3, 1998, the entire disclosure of which is incorporated by reference herein.

BACKGROUND OF THE INVENTION

1. Field of the Invention

The present invention relates to a communication node and a packet transfer method for transferring a segmented packet, and more particularly to a communication node and a packet transfer method for transferring a packet over a radio network which is a part of global packet-switched network (e.g., Internet).

2. Description of the Background

Recently, demand for radio communications has experienced an explosive increase. An infrastructure for radio communications, represented by cellular phones and PHS (Personal Handy Phone system), has been constructed at a drastically increased pace in recent years. Not only has voice communications been the focus of attention, data communications has attracted significant interest in the form of the Internet.

Future trends of communications networks include (1) a further increase in capacity of communications networks, (2) more widespread use of the so-called multimedia communications in which audio, video, data, etc. are integrated, and (3) an increase in Internet applications as well as more widespread use of the Internet.

Examples of the first trend include next-generation cellular phones (e.g., IMT-2000) and radio ATM networks. Standardization of radio ATM networks has been championed by MMAC. Examples of the second trend include standards (such as H.324) for TV phones. Examples of the third trend include the World Wide Web (WWW), Internet telephony, video-on-demand on the Internet, etc.

It should be noted that the above trends are not independent of one another, but will progress in a closely correlated fashion. For example, TV phones will be able to be implemented as an Internet application, and a radio infrastructure providing Internet services, etc. will emerge.

Key factors in enabling the construction of an infrastructure to support such applications as TV phones on the Internet in a mobile environment, include video/audio coding techniques (e.g., MPEG4), and real-time Internet protocols (e.g., RTP (Real-Time Transport Protocol)). MPEG4 provides coding of video and audio information in a network environment where bandwidth constraints are a major concern, such as phone lines and radio lines, by utilizing a highly efficient coding technique. From a protocol perspective, RTP is useful in operating video and audio applications in a network infrastructure where packets are susceptible to omission and delay, such as the Internet. A combination of these techniques (e.g., MPEG4 over RTP) is expected to realize in the bandwidth constrained Internet multimedia communication.

However, the following problem arises in realizing such Internet multimedia communication. When transmitting video and audio in accordance with MPEG4 in the radio environment, the efficiency of the coding scheme and the error resistance provide the capability to decode the video/audio with acceptable quality to the users, even if some data is omitted or arrives with bit errors during the transmission. In the case of where MPEG4 video/audio data is transmitted as Internet packets in a radio environment, the MPEG4 portion is resistant to errors, but the header portion (that is referred to and used by the network), such as the IP header and the UDP header, has no error resistance capability. If a bit error occurs in the header portion, the Internet packet including such a bit error must be discarded.

As described above, when a packet with a payload that includes data having certain burst error resistance and bit error resistance (e.g., MPEG4 video/audio) is transmitted in the radio environment, the entire packet must be discarded if a bit error occurs in the header portion of the packet. This is problematic because the packet is unnecessarily discarded if the payload can recover lost data, resulting in reduced system throughput.

SUMMARY OF THE INVENTION

In view of the situations set forth above, an object of the present invention is to provide a communication node and a packet transfer method which can reliably transfer a packet with a payload including data having error resistance in radio environments.

A communication node according to a first aspect of the present invention comprises means for dividing a packet to be transmitted into segments to form a plurality of packet segments; means for selecting an error correction scheme from among a plurality of error correction schemes prepared in advance to be employed for each of the packet segments in accordance with predetermined criteria; means for carrying out an error correction procession each packet segment with the selected error correction scheme; and means for transmitting each processed packet segment to a network.

A communication node according to a second aspect of the present invention comprises means for receiving packet segments from a network; means for selecting an error correction scheme from among a plurality of error correction schemes prepared in advance to be employed for each of the received packet segments based on predetermined information contained in each received packet segment; means for carrying out an error correction process on each received packet segment with the selected error correction scheme; and means for forming an original packet from the plurality of processed packet segments.

With the above features of the present invention, by way of example, when a header portion and a payload portion of a packet to be transmitted have different error resistance characteristics, the packet can be transmitted to a network under selection of error correction schemes suitable for the respective error resistance characteristics.

Preferably, the communication node may further comprise means for negotiating correspondence relations between predetermined information contained in the packet segments and error correction schemes to be employed for the packet segments containing the predetermined information, prior to transferring the plurality of packet segments between the communication node and another communication node opposite to each other via the network. In other words, the communication node includes a means for negotiating with another communication node that is connected to the network, prior to transferring the plurality of packet segments, the error correction scheme to be employed in relation to particular packet segments.

With the above features, the communication node on the packet transmitting side and the communication node on the packet receiving side can negotiate in advance as to what types of error correction schemes are used in communications.

Therefore, both the communication nodes can mutually agree about the error correction schemes to be used, and operate in synchronized relation based on the agreement.

Preferably, in the communication node on the packet transmitting side, the plurality of packet segments each may have a field describing therein information based on which the error correction scheme to be employed is selected, and the communication node may further comprise means for describing, in the field, the information corresponding to the selected error correction scheme.

With the above features, the communication node on the receiving side can recognize what type of error correction scheme is to be used to decode the received packet segment.

Preferably, in the communication node on the packet receiving side, the plurality of packet segments each may have a field describing therein information based on which the error correction scheme to be employed is selected, and the selecting means may select the error correction scheme to be employed based on the information described in the field.

With the above features, the communication node on the receiving side can recognize what type of error correction scheme is to be used to decode the received packet segment.

Preferably, the plurality of packet segments each may have a field describing therein information based on which the error correction scheme to be employed is selected, and the communication node may further comprise means for, prior to transferring the plurality of packet segments between the communication node and another communication node opposite to each other via the network, negotiating correspondence relations between the contents of information described in the field and error correction schemes to be employed.

With the above features, the communication node on the packet transmitting side and the communication node on the packet receiving side can negotiate in advance as to what types of error correction schemes are used in communications and values set in the field corresponding to the error correction schemes. Therefore, both the communication nodes can mutually agree about the error correction schemes to be used, and operate in synchronized relation based on the agreement.

Preferably, an error correction scheme employed for a particular one of the packet segment may have a higher correction ability than an error correction scheme employed for the other packet segments. In this case, preferably, the particular packet segment may be a packet segment including a header portion of the packet.

With the above features, since the header portion of a packet, for example, generally does not have error resistance, the header portion can be given a strong error correction ability. It is therefore possible to reduce a probability of the occurrence of errors in the packet header portion during radio transmission, and to avoid the packet from being discarded in a packet header processing unit in the communication node.

Preferably, the error correction scheme to be employed for the packet segments contained in the packet may be decided by referring to a value in a higher-level protocol field of the packet. Preferably, the error correction scheme to be employed for the packet segments contained in the packet may be decided by referring to a value of the port number in the packet.

With the above features, the error correction scheme can be flexibly selected in match with a higher-level protocol characteristic, for example, such that a strong error correction scheme is employed for a packet for which reliable communication is not expected with the transport layer, e.g., a UDP packet in the Internet, and a weak error correction scheme is employed for a packet for which reliable communication is expected with the transport layer, e.g., a TCP packet.

A packet transferring method according to a third aspect of the present invention comprises the steps of dividing a packet to be transmitted into segments to form a plurality of packet segments; from among a plurality of error correction schemes prepared in advance, selecting the scheme to be employed for each of the packet segments in accordance with predetermined criteria; carrying out an error correction process on each packet segment with the selected error correction scheme; transmitting each processed packet segment to a network; receiving packet segments from a network; from among a plurality of error correction schemes prepared in advance, selecting the scheme to be employed for each of the received packet segments based on predetermined information contained in each received packet segment, carrying out an error correction process on each received packet segment with the selected error correction scheme; and forming an original packet from the plurality of processed packet segments.

It is to be noted that the present invention relating to the apparatus is also effectuated as the invention relating to the method, and conversely the present invention relating to the method is also effectuated as the invention relating to the apparatus.

Further, the present invention relating to the apparatus or the method can also be effectuated in the form of a computer-readable recording medium which records thereon a program for rendering a computer to execute procedures equivalent to the means or steps in the present invention (or rendering a computer to function as means equivalent to that in the present invention, or rendering a computer to realize functions equivalent to those in the present invention).

With the present invention, when a header portion and a payload portion of a packet to be transmitted have different error resistance characteristics, the packet can be transmitted to a network under selection of error correction schemes suitable for the respective error resistance characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 shows one example of an MC table;

FIG. 8 shows one example of an FEC table;

DESCRIPTION OF THE PREFERRED EMBODIMENTS

Figure 1:
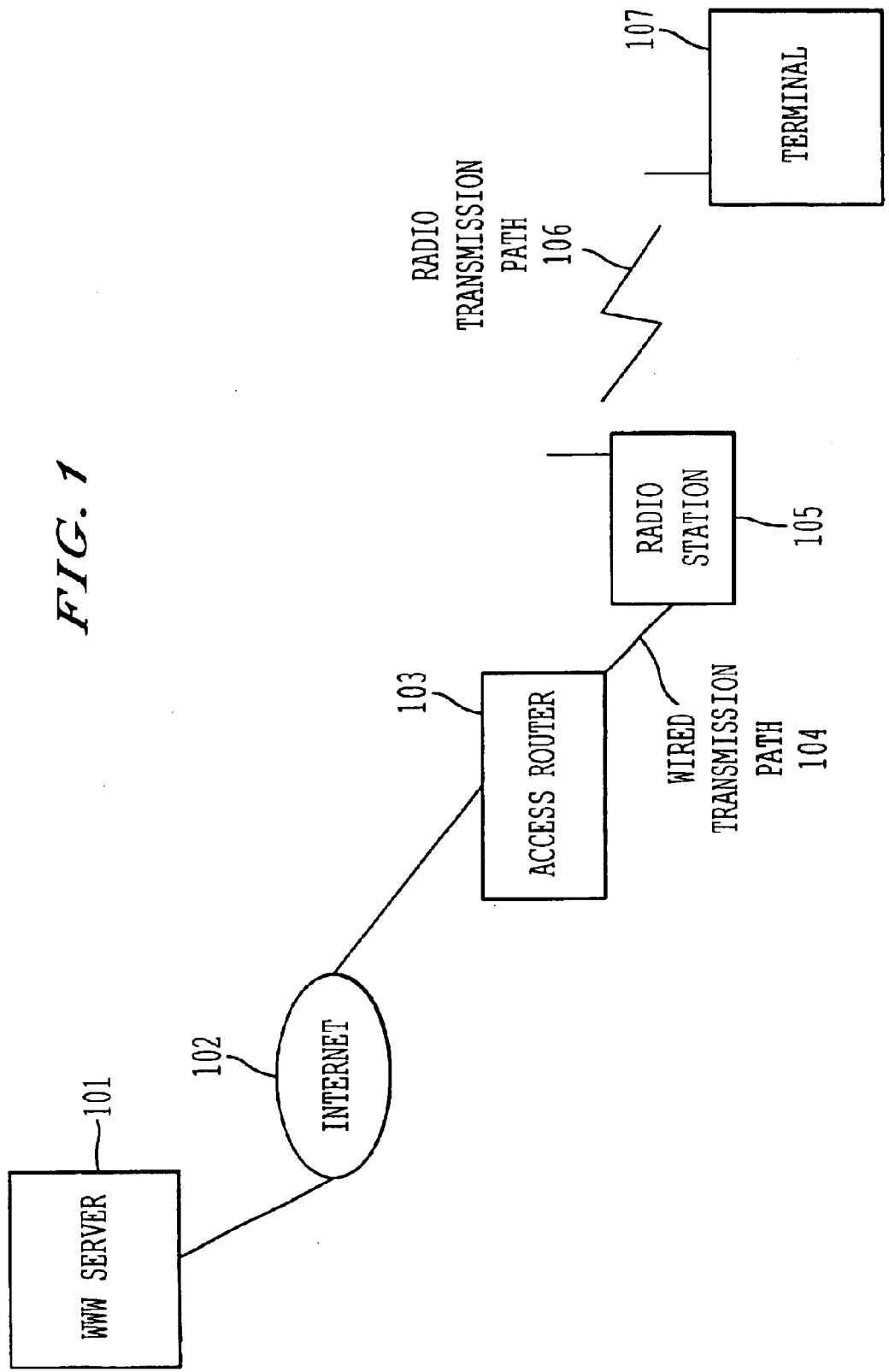
FIG. 1 shows one example of an entire configuration of a network system according co a first embodiment of the present invention.

Referring now to the drawings, wherein like reference numerals designate identical or corresponding parts throughout the several views.

FIG. 1 shows one example of an overall configuration of a network system according to a first embodiment of the present invention.

Referring to FIG. 1, a terminal 107 communicates with a WWW server 101 via a radio transmission path 106, such as a radio public network. Here, the WWW server 101, an access router 103, and the terminal 107 are nodes that are connected to the Internet 102.

In the Internet communication system shown in FIG. 1, transmission paths between the access router 103 and the terminal 107 (i.e., a wired transmission path 104 and the radio transmission path 106) are considered part of the Internet 102, beyond just the wired network. However, for purposes of explanation, the transmission paths 104 and 105 are considered separate from the Internet 102 to highlight the present invention, which focuses on the differences in transmission properties (e.g., a transmission error) between those transmission paths 104 and 105 and the Internet 102.

The terminal 107 securely establishes a connection to the access router 103 via the wired transmission path 104. In fact, radio station 105 is positioned between the access router 103 and the terminal 107. Specifically, radio station 105 is interposed between the wired transmission path 104 and the radio transmission path 106.

At the physical layer, the radio station 105 carries out processing such as transmission medium conversion. Processing for the link layer is carried out between the access router 103 and the terminal 107. In other words, the radio station 105 does not take part in processing for layers higher than the link layer.

In an exemplary embodiment, it is assumed that the radio transmission path 106 is a PHS (Personal Handy Phone system)—which is a radio public network. It is apparent that the present invention is not limited to the PHS network, but also applicable to any types of radio access network environments, such as a cellular phone network, a radio local loop, IMT 2000 (W-CDMA network), or a next-generation radio access network. The present invention is also applicable to non-public networks.

The protocol architecture as well as the network architecture, in accordance with one embodiment, is described below.

This embodiment provides, as described above, Internet communication between terminal 107 and WWW server 101. One important application over the Internet 102 is real-time video/audio communications. Real-time video/audio communication is carried out, utilizing a coding technique with high "error resistance". By way of example, the real-time video/audio communication is MPEG4 video and/or MPEG4 audio over the Internet 102 (including communications of only MPEG4 video, communications of only UNPEGS audio, and communications of both MPEG4 video and MPEG4 audio).

Figure 2:
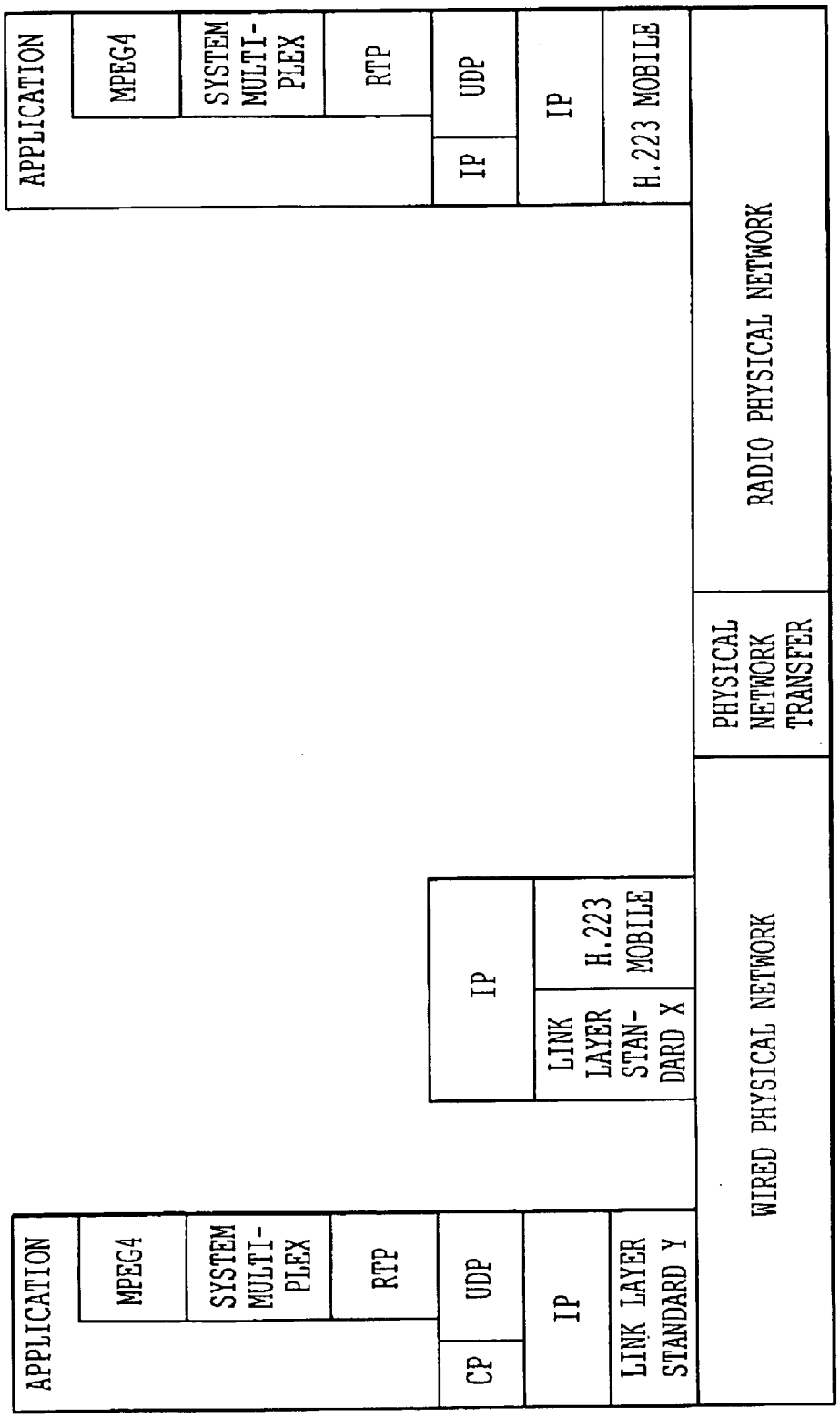
FIG. 2 shows one example of an overall layer configuration.

FIG. 2 shows one example of the protocol layers involved in the communication between the terminal 107 and the WWW server 101. Those layers higher than the transport protocol (i.e., layers higher than TCP/UDP) are usually not terminated in a router (the access router 103 in FIG. 1) within the Internet 102. That is, in the network configuration of FIG. 1, protocol stacks for layers higher than the transport layer are present only in the WWW server 101 and the terminal 107.

Since packet transfer is carried out in the form of an IP (Internet Protocol) packet, IP is employed as the network layer protocol. IP layer processing is performed not only in the WWW server 101 and the terminal 107, but also in the access router 103, which relays the IP packet. Although only the access router 103 is shown in FIG. 1, numerous routers exist within the Internet 102. In this case, IP layer processing is performed in every router.

In addition to transferring real-time video/audio information within packets, as in the exemplary embodiment, the packet may include data other than real-time video/audio information, such as a control information, etc.

As for the link layer protocol, H.223 mobile standard is employed between the access router 103 and the terminal 107, according to one embodiment. By operating the H.223 protocol between the access router 103 and the terminal 107, these devices 103 and 107 are provided with a certain level of reliability. The details of H.223 will be described later.

Link layer protocols between the WWW server 101 and the access router 103 are assumed to be link layer standards Y and X for convenience (i.e., the link layer standard of a link associated with the WWW server 101 is Y and the link layer standard of a link associated with the Internet 102 side of the access router 103 is X).

As shown in FIGS. 1 and 2, the WWW server 101 communicates with the radio station 1105 via a wired transmission network, while the radio station 105 communicates with the terminal 107 over a radio transmission network. At the physical layer, therefore, the radio station 105 performs a transmission medium transfer process between the wired and radio networks.

Packet format will be described next.

Figure 3:
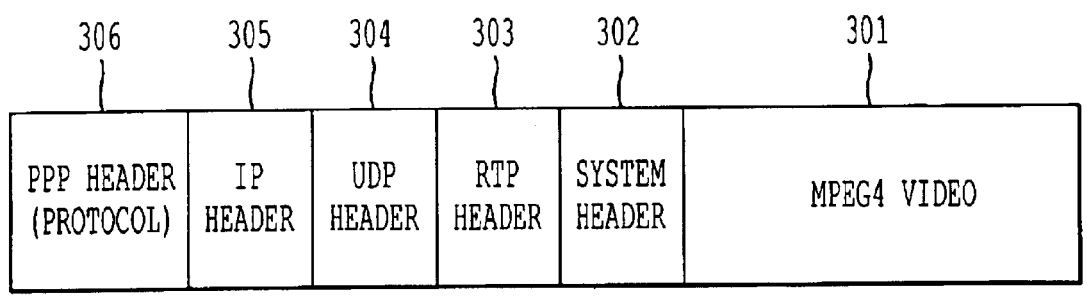
FIG. 3 shows one example of a transfer packet format.

FIG. 3 shows one example of a packet format, which contains MPEG4 video. As indicated above, such a packet is transferred between the access router 103 and the-terminal 107 using the described protocol environments. In accordance with the protocol stack shown in FIG. 2, an MPEG4 video 301 is capsulated in a system header 302 containing time stamp information, inter-media synch information, etc. Then, an RTP header 303, a UDP header 304, and an IP header 305 are added to the system header successively in the respective order. Finally, a PPP (Point-to-Point Protocol) header (306) is added.

It is sufficient for the PPP header to contain protocol identification data to identify protocol types such as IPv4 and IPv6. The packet header can be detected by using the H.223 as the link layer protocol; consequently, using a field that solemn changes is inefficient. For this reason, a flag sequence field (for detecting the packet boundary), an address field (containing always the same value), and a control field (containing always the same value), which are used in PPP of RFC 1661, are not needed.

Note that detection of the packet boundary (i.e., detection of a header fragment in a packet) can also be performed using a value of the link layer header (specifically a value of the MUX code (MC)). This approach is more fully described later.

Figure 4:
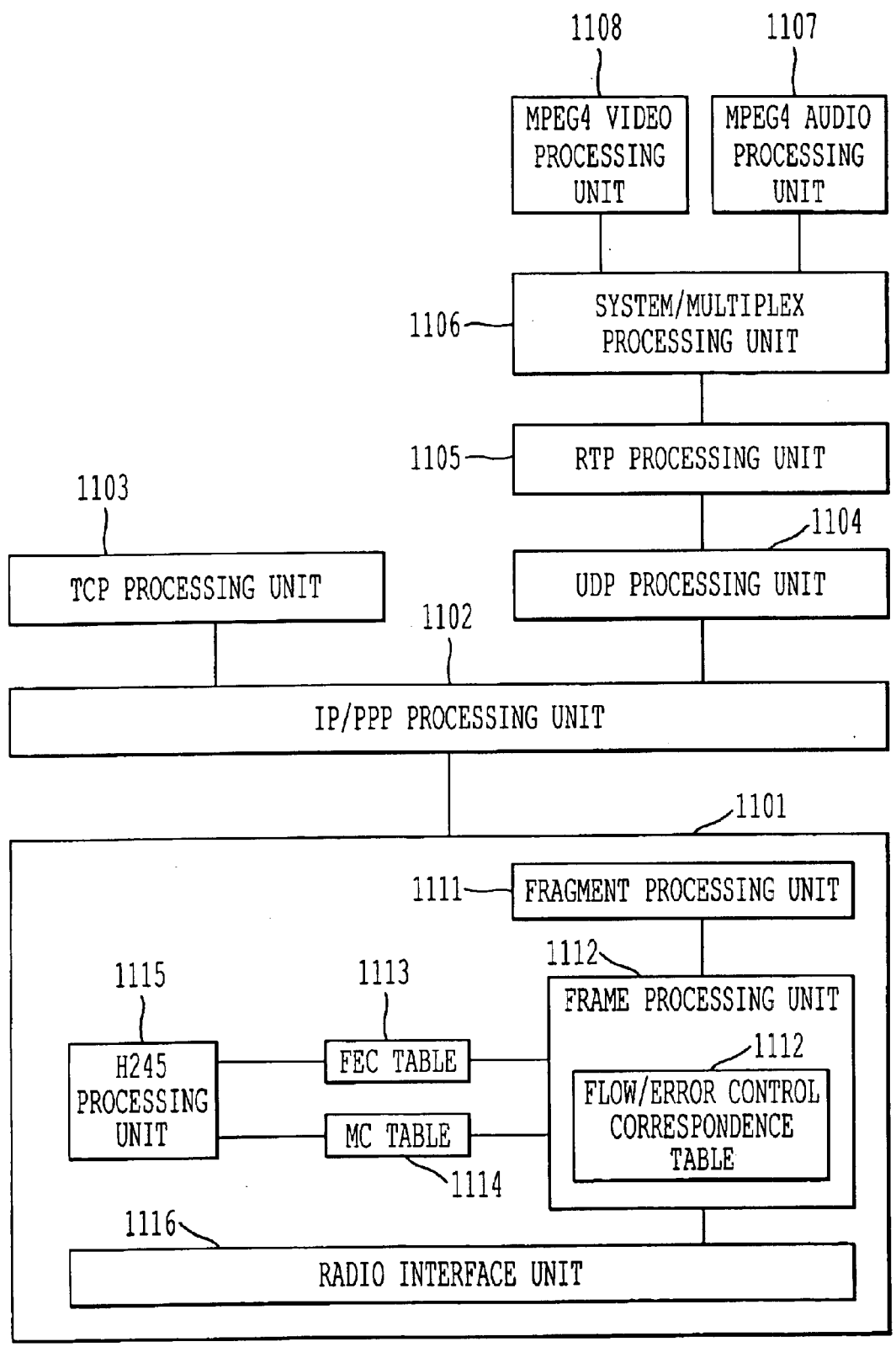
FIG. 4 shows one example of an internal configuration of a terminal.

FIG. 4 shows one example of an internal configuration of the terminal 107 according to an embodiment of the present invention. As shown in FIG. 4, the terminal 107 comprises an H.223 mobile processing unit 1101, which performs the processing related to the H.223 mobile serving as the link layer protocol. The terminal 107 also comprises an IP/PPP processing unit 1102 for carrying out the processing related to IF and Pap, and a TCP processing unit 1103 for carrying out the processing related to TCP. Further, the terminal 107 includes a UDP processing unit 1104 for carrying out the processing related to UDP, and an RTP processing unit 1105 for carrying out the processing related to RTP (Real-time Transport Protocol). A system/multiplex processing unit 1106 is included in the terminal 107 for carrying out such processing as adding control information (e.g, time stamp information and inter-media synch information), which is necessary in the MPEG4 application, to the coded audio/video data in a transmission mode. The system/multiplex processing unit 1106 also interprets the control information and starts up the decoding process in reception mode. The terminal 107 also comprises an MPEG4 audio processing unit 1107 for carrying out coding and decoding of the MPEG4 audio data, and an MPEG4 video processing unit 1108 for carrying out coding and decoding of the MPEG4 video data. The H.223 mobile processing unit 1101 comprises the following components: a fragment processing unit 1111 for dividing a packet into fragments, a frame processing unit 1112 for setting the fragments on a frame; an FEC table 1113 for storing the correspondence between FEC codes in the frame and FEC types used; an MC table 1114 for storing the correspondence between MC codes in the frame and data identification information, attributes, etc.; an H.245 processing unit 1115 for carrying out the processing related to an H.245 protocol; and a radio interface unit 1116 for carrying out the interface processing with respect to the radio network. Additionally, a radio transmitter/receiver may be built in the terminal 107 or connected to the terminal 107 externally—e.g., a PHS terminal. As described later, the frame processing unit 1112 may include a flow/error control correspondence table 1117 for storing the correspondence between predetermined packet attributes and to be added MC codes. It should be noted that functions of inputting (or composing or editing) data to be coded and transmitted, and functions of outputting (or recording, displaying or reproducing) data received and decoded are omitted.

The construction and operation of the terminal 107 will be described below in connection with, by way of example, placing video and audio that are encoded in accordance with MPEG4 or the like, in an IP packet; in particular, the case in which the terminal 107 is on the transmission side. First, MPEG4 data is decoded in the MPEG4 video processing unit 1108 and/or the MPEG4 audio processing unit 1107. The system/multiplex processing unit 1106 adds control information (e.g., time stamp information and inter-media synch information) to the coded data. The header added here is referred to as the system header (302 in FIG. 3).

The RTP processing unit 1105 encapsulates the added data with the system header. RTP is a de facto standard of the transport protocol for transferring traffic of a real-time application on the premise that data delivery is delayed or lost in the Internet, etc. Usually, RTP is employed in combination with RTCP (Real-time Transport Control Protocol) for exchanging packets in the network, etc. between the transmitting side and the receiving side. Details of RTP are explained in RFC 1889 and 1890.

Thereafter, the RTP is set on UDP (User Datagram Protocol) in the UDP processing unit 1104, converted into an IP packet in the TP/PPP processing unit 1102, and then transferred as an Internet packet (see FIG. 3) over the Internet 102 including the radio transmission path 106. As described later, the Internet packet is transferred over the radio transmission path in such a manner that it is divided into segments in the H.223 mobile processing unit 1101 and set on a frame.

The H.223 mobile will now be described.

The packet shown in FIG. 3 is transferred between the access router 103 and the terminal 107 in accordance with H.223 (see FIG. 2), which is a link layer protocol. The H.223 mobile processing unit 1101 carries out the processing necessary for the packet transfer.

Figure 5:
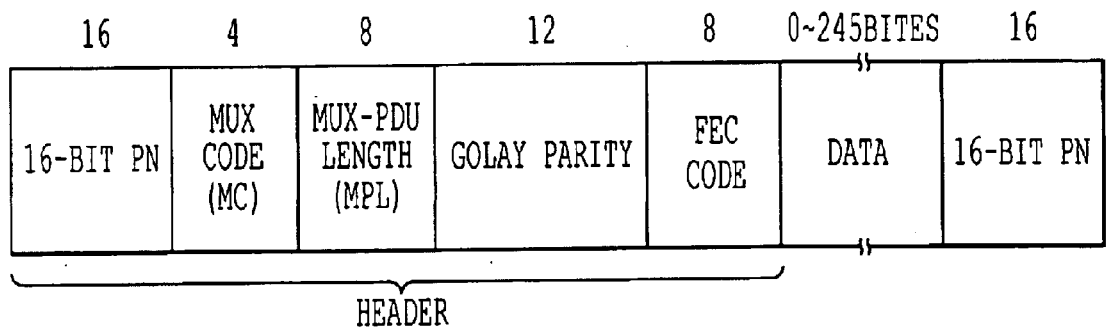
FIG. 5 shows one example of a frame transmission format on a radio transmission path.

FIG. 5 shows one example of a frame transmission format on the radio transmission path 106. As shown in FIG. 5, one frame transfers 0 to 254 bytes of data. One frame consists of the data, a 16-bit P.N., a MUS code (MC), a MUX-POW length (MEL), a Golay parity code, a header comprising an FEC type code, and a trailer comprising 16-bit P.N. The frame is constructed primarily by the frame processing unit 1112. Numerals indicated in FIG. 5 above respective areas denote, by way of example, the number of bits contained in the areas.

Synchronization of the packet (i.e., detection of the head and tail of the packet) is performed using two sets of 16-bit PN and M.L. Specifically, the two sets of 16-bit PN are each constructed as a predetermined pattern and are always positioned at the head and tail of the packet, respectively. If such a pattern is detected, it is recognized that the detected point is a candidate for the boundary of the frame. Thereafter, the area of M.L. is checked.

After recognizing the length of the relevant frame in the area of MPL, the other 16 bits are checked in consideration of the data area corresponding to the M.L. length. If an area of the 16-bit PN is found again, it is determined that the frame is correctly synchronized.

The MUX code represents the attributes of the data transferred. The FEW code represents the attributes of a forward error correction code applied to the data. The MUS code and the FEC code are each simply given as a numerical value. Prior to the start of communication, the meanings of the respective numerical values are negotiated beforehand between both terminals, which will then communicate using H.235.

Figure 6:
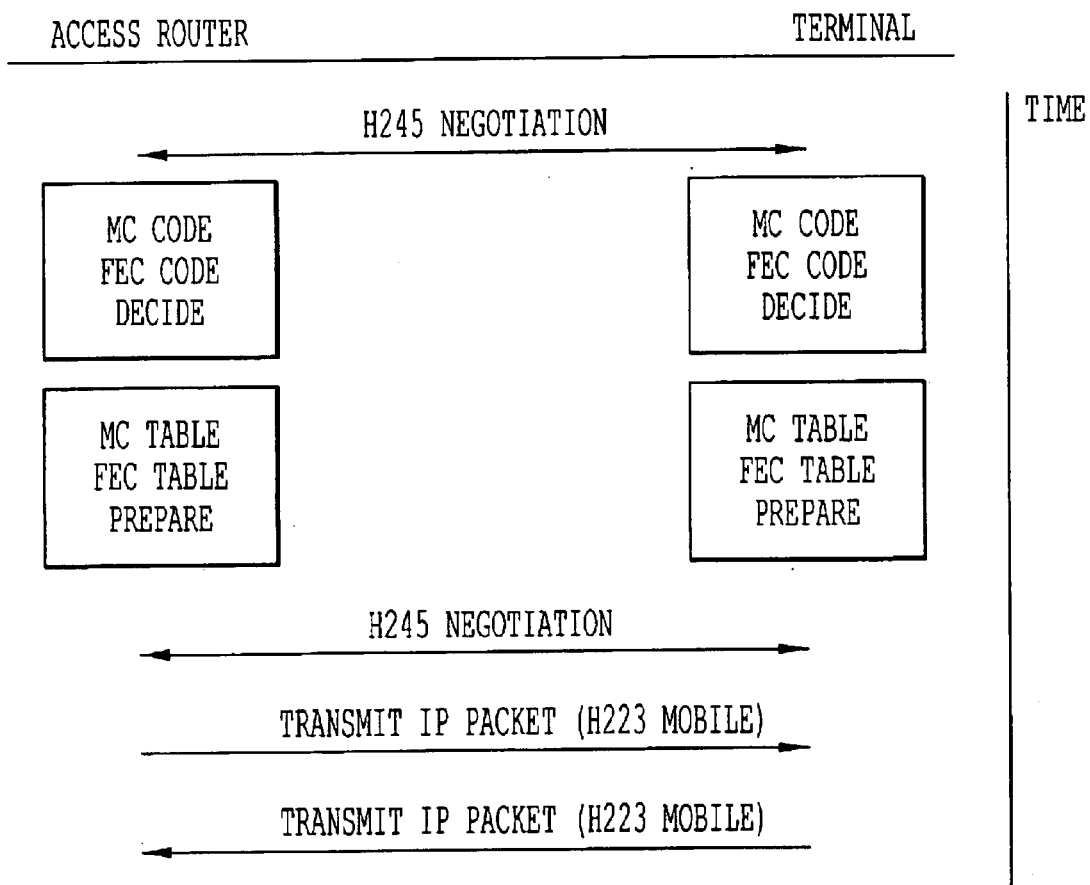
FIG. 6 shows one example of an entire sequence.

FIG. 6 shows one example of the negotiation process between the access router 103 and the terminal 107. The H.245 protocol is used in the negotiation. The negotiation process is executed by the H.245 processing unit 1115 in the H223 mobile processing unit 1101. In this embodiment, as shown in FIG. 6, the meanings of respective numeral values of the MC code and the FEC code are negotiated between the access router 103 and the terminal 107. Results of the negotiation related to the MC code and the FEC code are reflected in the MC table 1114 (see FIG. 7) and the EEC table 1113 (see FIG. 8). These two tables are held in both nodes, i.e., the access router 103 and the terminal 107.

FIG. 7 shows one example of the MC table 1114, and FIG. 8 shows one example of the FEC table 1113. It is negotiated, for example, that in the case of MC=1 and MC=2, data having different attributes (DATA 1 for MC=1 and DATA 2 for MC=2) are communicated, and that in the case of MC=1, FEC1 is used as the FEC scheme if the FEC code=1 holds and FEC2 is used as the FEC scheme if the FEC code=2 holds. The results are then reflected in the tables as shown in FIGS. 7 and 8.

Thus, the FEC table may be defined for each MUS code, in which the values of the FEC code may have different meanings for each MUS code, as illustrated in FIG. 8. It should be noted that the FEC table may be defined regardless of the MUS code.

Use of error correction schemes with different levels will be described next.

In this embodiment, the MPEG4 video/audio is transmitted over, by way of example, the Internet 102. The MPEG4 is a coding technique that has very high "error resistance" because it was developed in anticipation of a very poor communications network environment (i.e., network environment where data is susceptible to large bit error rate, burst error, or omission); for example, a radio transmission path 106 and the Internet 102. Also, MPEG4 permits communication at a very low bit rate to accommodate low bandwidth media, such as phone lines and radio lines, as compared to Ethernet LAN or the like.

In the present invention, it is believed that when the contents of a packet payload have strong error resistance, such as MPEG4, the payload has a certain level of resistance against errors caused by packet omissions on the Internet and bit errors from radio section of the transmission path.

As shown in FIG. 3, various headers (i.e., the system header, the RTP header, the UDP header, the IP header and the PPP header) are added to the transferred packet in addition to the MPEG4 video/audio. If the header portion is subject to an error of even one bit in the radio transmission region, for example, this gives rise to a fatal error that is not tolerated by the terminal on the receiving side. The error in the header could result in erroneous information, such as a change of the destination/source address/port numbers and "change of value of the time stamp".

Even though the payload was prepared using a coding technique with high error resistance like MPEG4, if an error occurs in the header, the packet is discarded before reaching an MPEG processing module of a node, such as a terminal (the MPEG4 audio processing unit 1107 or the MPEG4 video processing unit 1108 in FIG. 4). For example, if an error of even a single bit occurs in the IP process that is executed in the IP/PPP processing unit 1102, the relevant packet is discarded.

To overcome such a problem, it is contemplated that a strong error correction code is applied to the header group (302–306) in FIG. 3 when a packet containing data with high error resistance, such as MPEG4 video/audio, is transmitted over the radio transmission path. However, for a payload (e.g., portion of the MPEG4 video 301) that has high error resistance originally, a strong error correction code is not required. It is sufficient to reduce the error rate on the radio transmission path 106 to match the error resistance of MPEG4. In other words, when transferring the packet shown in FIG. 3, error correction codes having different levels of strength are applied to the header portion (302–306) and the payload portion 301.

Assuming, for example, that a bit error rate in the radio transmission path (106 in FIG. 1) of $10^{-3}$ does not pose problems in reproducing data and the error resistance of MPEG4 corresponds to a bit error rate on the order of $10^{-6}$, the error correction code (e.g., FEC1) applied to the header portion is selected to have a correction ability capable of substantially completely correcting the error rate of $10^{-3}$ on the radio transmission path. Also, the error correction code (e.g., FEW.) that is applied to the payload portion, which is expected to have error resistance (such as given by MPEG4), is selected to have a correction capability of reducing the error rate of $10^{-3}$ on the radio transmission path down to a limit value of the error resistance of MPEG4, i.e., the error rate of $10^{-4}$.

In other words, in this embodiment, the strong error correction code (FEW.) is applied to the header portion (302–306) to substantially completely remove errors generated on the radio transmission path 106. Further, the weak error correction code (FEC2) is applied to the payload portion (portion of the MPEG4 video 301) so as to maintain the original error resistance of the MPEG4 video despite the fact that errors to some extent remain in the MPEG4 video portion.

Note that, in this embodiment, the check sum of UDP is assumed to be turned off.

Selecting the weak error correction code FEC2 is effective in reducing the number of bits transmitted in radio communications and increasing the transfer bit rate. Further, since the header portion is generally much smaller than the payload portion, the strong error correction code FEC1 is applied to the header portion. In addition, the number of redundant bits is not so increased.

Based on the above consideration, using an H.245 negotiation process (in FIG. 6), a strong error correction code FEC1 is employed for the header portion in which any data error is not basically allowed, and the weak error correction code FEC2 is employed for the MPEG4 video/audio portion in which some data error is tolerated. The FEW table shown in FIG. 8 is then prepared to hold the contents of the negotiation results in the form of an internal table.

Figure 9:
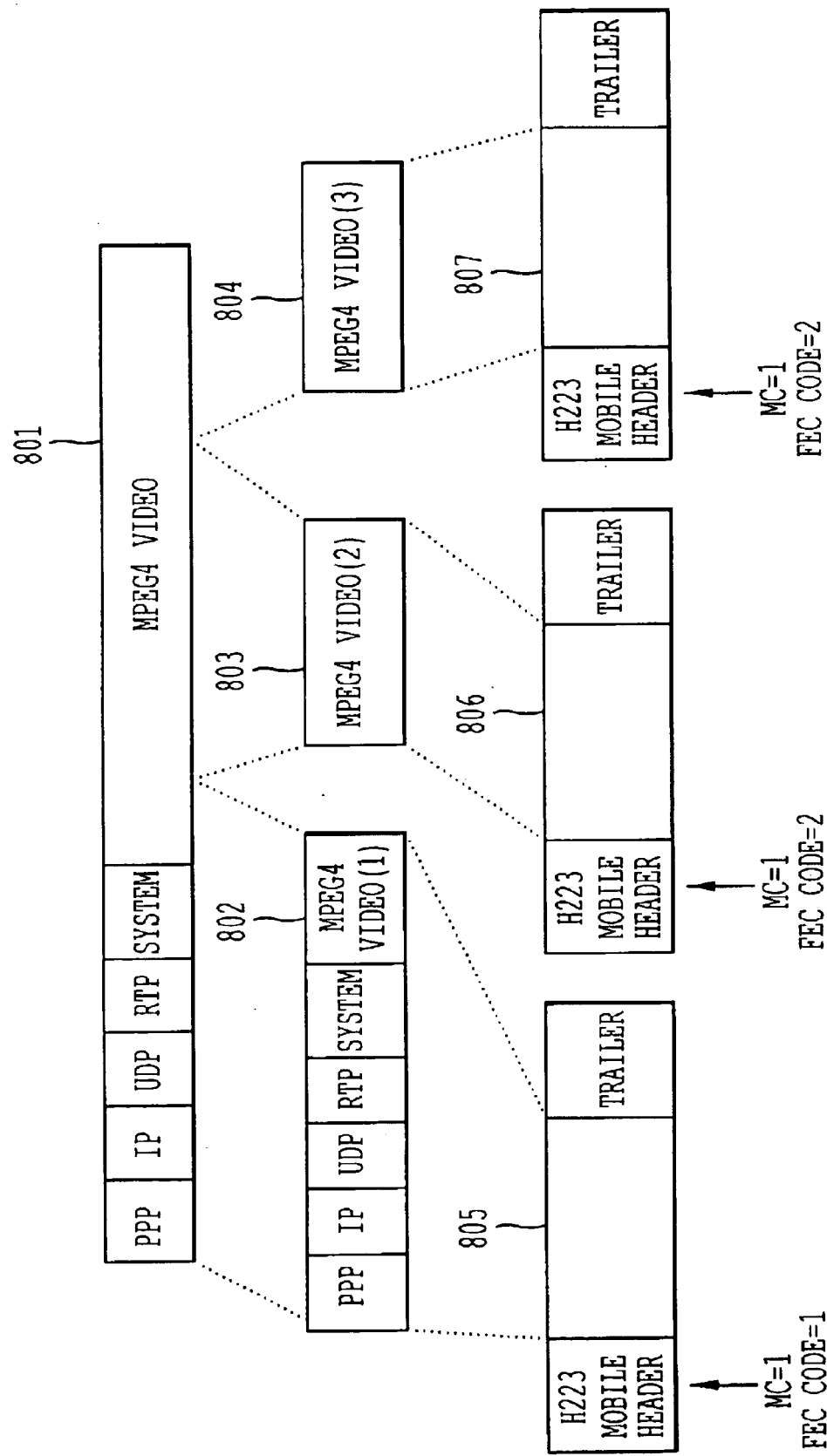
FIG. 9 is a diagram showing a process of transforming an MPEG4 packet into an H.223 mobile frame.

An example of transferring an MPEG4-over-IP packet is be described below with reference to FIG. 9.

A packet 801 (see FIG. 3), that is to be transferred, is divided into fragments having a size not larger than the link layer MT. (Maximum Transfer Unit)—i.e., the maximum value of a frame length transferable with the link layer. This division into fragments is performed in the fragment processing unit 1111.

As a result of the fragmentation, the entire header portion (302–306 in FIG. 3) is included in a first fragment 802. In FIG. 9, the first fragment 802 also includes a part of the MPEG4 video as well as the header portion. The portion of the MPEG4 video is eventually divided into several segments (in the example of FIG. 9, the payload portion, i.e., the portion of the MPEG4 video 301, is divided into three fragments 802, 803 and 804). The fragments are then set on the frame transmission format for radio communications, shown in FIG. 5, in the frame processing unit 1112, and are transmitted through the radio interface unit 1116.

As shown at 805 in FIG. 8, the first fragment 802 is converted into a frame in accordance with H.223, whereby FEC. is employed as the error correction code for the first fragment 802 because of the strong error correction code capability of FEC. Accordingly, the value of the MUX code is set to 1, and the value of the FEC code is set to 1 in the frame; thereafter, the frame is transmitted.

On the other hand, for the second and subsequent fragments 803 and 804, FEC2 is employed as the error correction code because a relatively weak error correction code, which suppresses the error rate down to a level corresponding to the error resistance of MPEG4, is acceptable. Accordingly, the value of the MUX code is set to 1 and the value of the FEC code is set to 2 in the frame; thereafter, the frame is transmitted.

While the example of FIG. 9 has been described in connection with MPEG4 data as the payload of the IP packet, the present invention has applicability to the transfer of to IP packets in general, regardless of the attributes of data that is contained in the payload. One example of such a case will be described with reference to FIG. 10.

Figure 10:
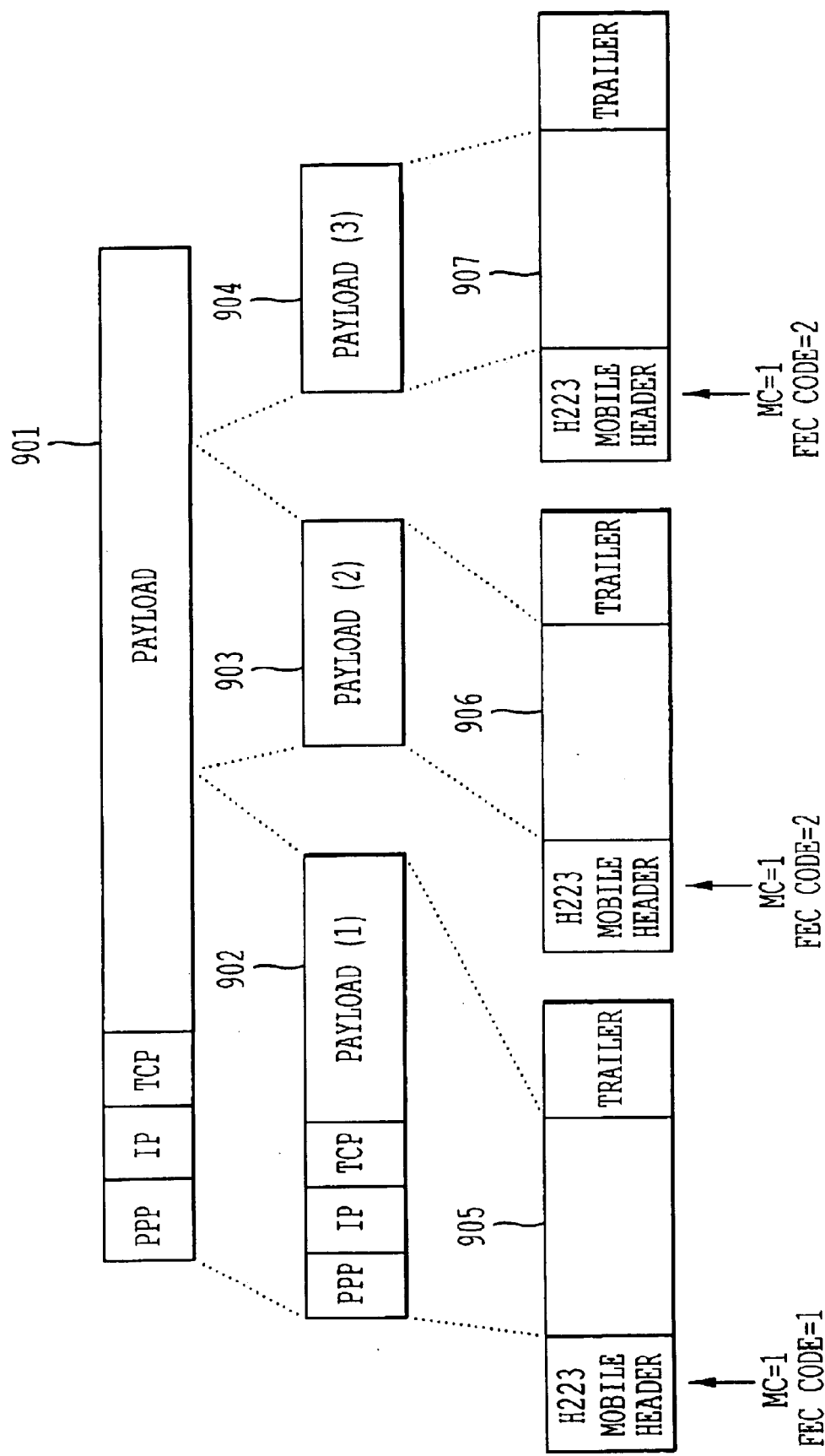
FIG. 10 is a diagram showing a process of transforming a general IP packet into an H.223 mobile frame.

FIG. 10 shows one example of IP packets generally transferred, in which TCP is employed as the transport protocol. In this scenario, as with the case of FIG. 9, FEC is employed as the error correction code for a first fragment 902 because a strong error correction code should be applied. On the other hand, second and subsequent fragments 903 and 904 may be transferred using the relatively weak error correction code FEC2.

In the example of FIG. 10, the data contained in the payload of the packet 901 generally does not always have error resistance. TCP carries out error detection up to the IP header. Accordingly, the strong error correction code FEC1 is applied to the first fragment 902, but the weak error correction code FEC2 is applied to the subsequent fragments 903 and 904. Therefore, if an error occurs in the fragments 903 and 904 and is not completely corrected by FEC2, such an error corrupts the data that is received by the terminal 107 on the receiving side. However, if an error occurs in segments 906 and 907 for any reason, the error is detected by the CAC of TCP, and the whole of the relevant packet is retransmitted in the TCP layer. As a result, the packet is successfully delivered.

There are two reasons why the strong error correction code FEC1 is applied to the initial fragment 902. First, because the PPP header is excluded from being subject to error correction by TCP, the use of FEC1 reduces the probability of errors occurring in the PPP header. Secondly, in many cases of actual IP communications, error control is not applied to the data in the header portion. Such is the case of transport layer protocols other than TCP; e.g., IP phones using UDP as the transport protocol. In those cases, various "error unallowable areas" (i.e., areas where if an error occurs, the system may malfunction, or the relevant packet is discarded unconditionally regardless of the attributes of data in the payload), such as the IP header and the transport header, exists in the first fragment. Accordingly, applying the error correction code with strong error correction ability to the first fragment is effective, in such cases.

The above description discussed the process of manipulating the packet with respect to the transmitting side of the terminal 107. When the terminal 107 is on the receiving side, the process is basically performed in a reversed manner.

Assuming the terminal 107 shown in FIG. 4 is to receive the packets, a frame received by the radio interface unit 1116 in the H.223 mobile processing unit 1101 is first subject to frame synchronization in the frame processing unit 1112. Next, necessary information is obtained from the MC code of the received frame by referring to the MC table 1114, and the FEC scheme to be employed is selected by referring to the FEC table 1113 based on the FEC code (or referring to the FEC table 1113 based on the MC code and the FEC code when the contents of the FEC table 1113 are defined for each MC code). The error correction code is then applied to each frame. In the examples of FIGS. 7 and 8, when the MC code=1 and the FEC code=1 hold in the received frame, it is understood that the FEC scheme to be employed is FEC. The frame for which the error correction has not been completely performed is discarded.

Having passed the error correction process, the fragments are taken out of the frame and transferred to the fragment processing unit 1111, where the fragments are assembled into a packet again. This packet is subject to the PPP process and IP process in the IP/PPP processing unit 1102. After successively passing the UDP process in the UDP processing unit 1104, the RTP process in the RTP processing unit 1105, and the system process in the system/multiplex processing unit 1106, the packet is MPEG4-decoded in the MPEG4 audio processing unit 1107 and/or the MPEG4 video processing unit 1108. The decoded data is then transferred to an application, for example.

In the example of FIG. 10, the error correction codes with different levels of correction capability are separately applied to the first fragment 902 and the second and subsequent fragments 903–904. Taking into account the above characteristic, however, an option of retransmitting data with the function of the link layer if an error occurs may be selected for the second and subsequent fragments depending on, for example, the attributes of data. One example of a scenario whereby such an option is selected will be described below with reference to FIG. 11.

Figure 11:
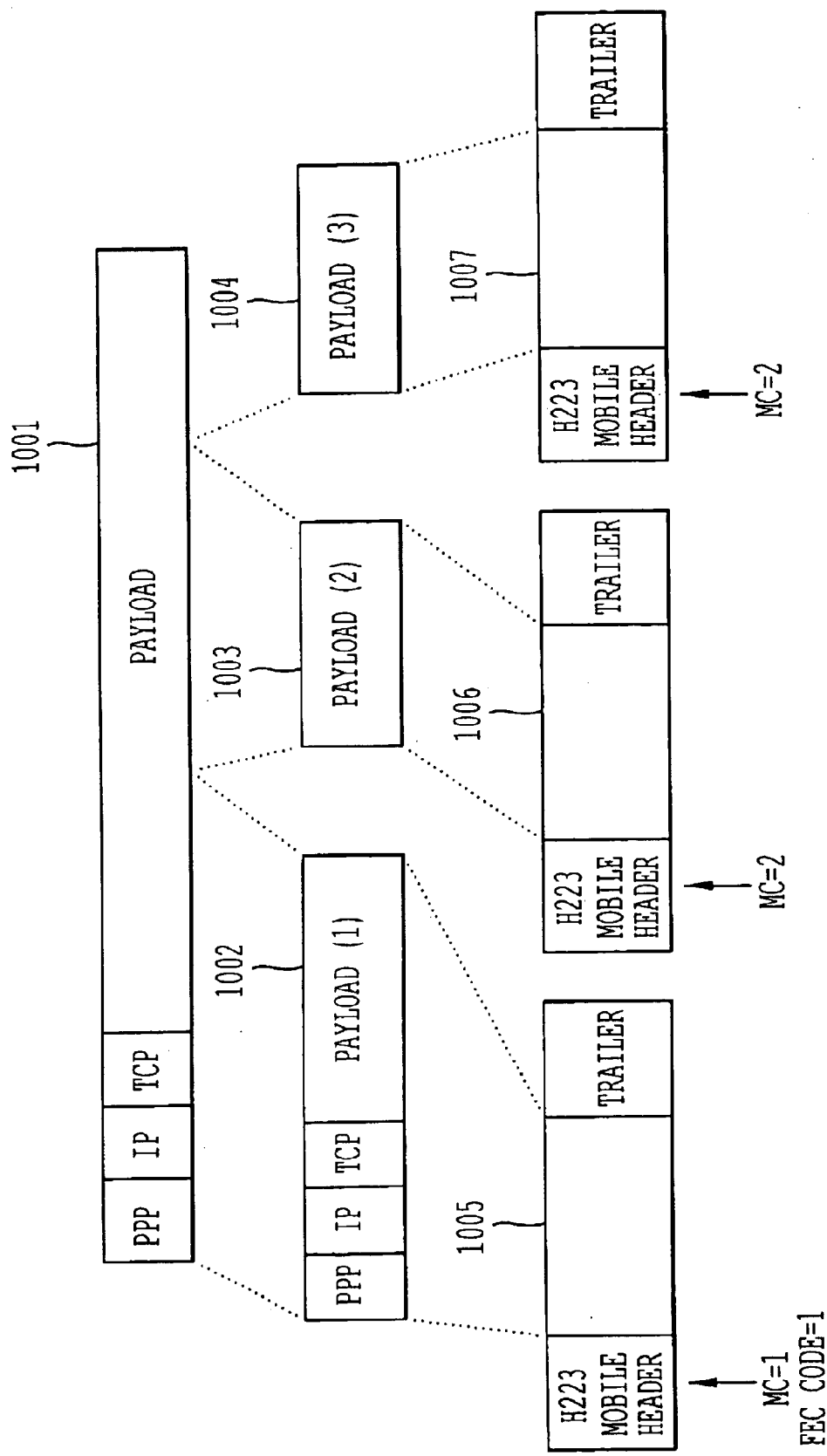
FIG. 11 is a diagram illustrating a process of transforming a general IP packet into an H.223 mobile frame.

FIG. 11 shows one example of IP packets that are generally transferred, in which TCP is employed as the transport protocol. In an exemplary embodiment, it is assumed that the H.245 negotiation (in FIG. 6) decides whether the retransmit control that is to be carried out as the error control scheme in the link layer, when DATA2 corresponding to the Max code=2 is transferred. It is also assumed that the error control scheme is the same as described above in the case of the MUX code=1.

Based on those assumptions, as shown in FIG. 11, second and subsequent fragments 1103–1104 are transferred with the MUX code=2 set in the H.223 header (the FEC code is not necessarily required). Accordingly, if an error occurs in the fragments (1006–1107) between the access router 103 and the terminal 107 and is not completely corrected by the error correction code (Golay parity), error control can be performed in such a manner as to invoke the retransmit control for an entire fragment.

On the other hand, the MUX code=1 and the FEC code=1 are set for the first fragment 1002, so that the error correction code FEC1 is applied to the first fragment 1002 before transmitting the subsequent fragments. It is thus expected that any potential errors that may have occurred on the radio transmission path 106 are substantially completely corrected.

The process on the receiving side is basically the same as in the example of FIG. 10. In this example, however, when the MUX code=2 is detected in the received frame, the receiving-side terminal can confirm that the retransmit control is to be performed by referring to the MC table 1114. Accordingly, upon the occurrence of an error, the error control is not performed, and the retransmit control is performed, unlike the example of FIG. 10. When the MUX code=2 is detected in the received frame, the frame is processed in the same manner as in the example of FIG. 10. The above description has been made as applying different error corrections codes depending on fragments, which are prepared by dividing a particular packet.

In actual Internet communication, there are mixed packets having various attributes. For example, the same radio terminal may transfer a file, while operating an MPEG4 application. Thus, a variety of situations, such as coexistence of TCP communication and UDP communication, may occur. Such a coexistence of differing packets can be dealt with, for example; by carrying out error control based on the forward error correction code, as shown in FIG. 9, when the packet is an MPEG4 packet (or a UDP packet), and carrying out error control based on the retransmit control, as shown in FIG. 11, when the packet is a TCP packet.

The reasons for changing the error control scheme are discussed below. In the case of an MPEG4 packet, a retransmit control would not be effective because of the time-sensitivity of the application; moreover, the MPEG4 data itself has error resistance. It is therefore sufficient to apply the "weak" error correction code to the MPEG4 packet. On the other hand, for the TCP packet, the payload is not expected to have error resistance, and thus, the retransmit control in the radio transmission path 106 is appropriate, matching the characteristic of TCP (i.e., a delay in transmission gives rise no serious problem). Thus, there is a merit in changing the error control scheme depending on the attributes of a packet at the higher-level layer.

Figures 12, 13:
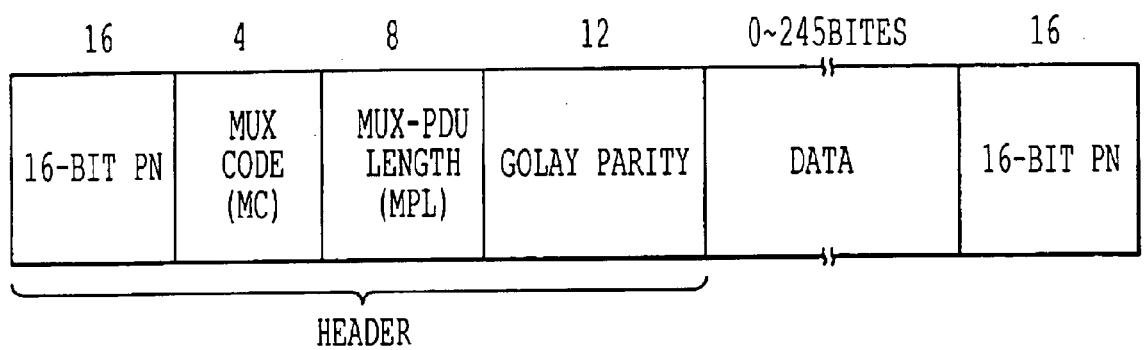
FIG. 12 shows one example of a flow/error control correspondence table.
FIG. 13 shows one example of a frame transmission format on a radio transmission path in a second embodiment of the present invention.

As a mechanism for implementing the above error control scheme, the flow/error control correspondence table 1117 is prepared in the frame processing unit 1112 as shown in FIG. 12, by way of example, to specify the error control scheme to be employed for each higher-level layer protocol of a passing packet, or for each passing IP flow (an arbitrary combination of the source address, source port number, destination address and destination port number, or an arbitrary combination of those items and the higher-level layer protocol). When transmitting a packet in the form of divided fragments to a network, one exemplary method involves the frame processing unit 1112 receiving the attributes of the packet (i.e., information regarding the higher-level layer protocol or flow) from the fragment processing unit 1111, and deciding the error control scheme to applied to each of the fragments by referring to the flow/error control correspondence table 1117 of FIG. 12 based on the received information. For example, whether the packet is a TCP flow or a UDP flow is determined by referring to the protocol type field of the IP header. Then, the error control scheme to be applied to each fragment (of the packet) is determined by referring to the table of FIG. 12.

As mentioned earlier, when the protocol type field indicates the TCP protocol, the error correction scheme FEC1 having a strong correction ability is employed for the first fragment and the relatively weak error correction scheme FEC2 is employed for the second and subsequent fragments. On the other hand, when the protocol type field indicates the UDP protocol, the error correction scheme FEC1 with a strong correction ability is employed for the first fragment and the retransmit control is applied to the second and subsequent fragments.

The error control scheme can be changed in various ways depending on which one of the attributes is to be taken into consideration. Turning to the above TCP example, in some of the packets with the TCP protocol, the payload has error resistance in itself. This characteristic of the payload can be ascertained by checking the port number. Therefore, the error control scheme may be changed depending on the port number (the protocol type field and the port number).

While only the internal configuration of the terminal 107 has been described, it is a evident that the access router 103 may also have a similar internal configuration.

Further, the first embodiment has been described as allocating the payload portion (MPEG4 video) to all the first to third fragments. It is however also possible to include only the header portion from the PPP header to the system header, which are low in error resistance, in the first fragment, and to allocate the MPEG4 video portion having high error resistance to the second and subsequent fragments.

The above first embodiment has been described as employing H.223 and as having an area of the FEC code in the H.223 header. In a second embodiment described below, the area of the FEC code does not exist in the H.223 header, and the type of the FEC code applied to a transmitted frame is implicitly contained in the MUX code (MC).

The network system configuration, the entire layer configuration, and the transfer packet format for use in the second embodiment are basically similar to those, shown in FIGS. 11 to 3, in the first embodiment. The terminal internal configuration resembles the configuration shown in FIG. 4, except that, as will be described in detailed later, neither the FEC table 1113 nor the function to carry out the processing related to the FEC table 1113 are required. Because of the many similarities between the first embodiment and the second embodiment, only those aspects that differ will be discussed below.

FIG. 13 shows an example of a frame transmission format used over a radio transmission path, according to a second embodiment of the present invention. The frame transmission format differs from the format in the first embodiment, shown in FIG. 5, in that the FEC type code is omitted from the header.

Figures 14, 15:
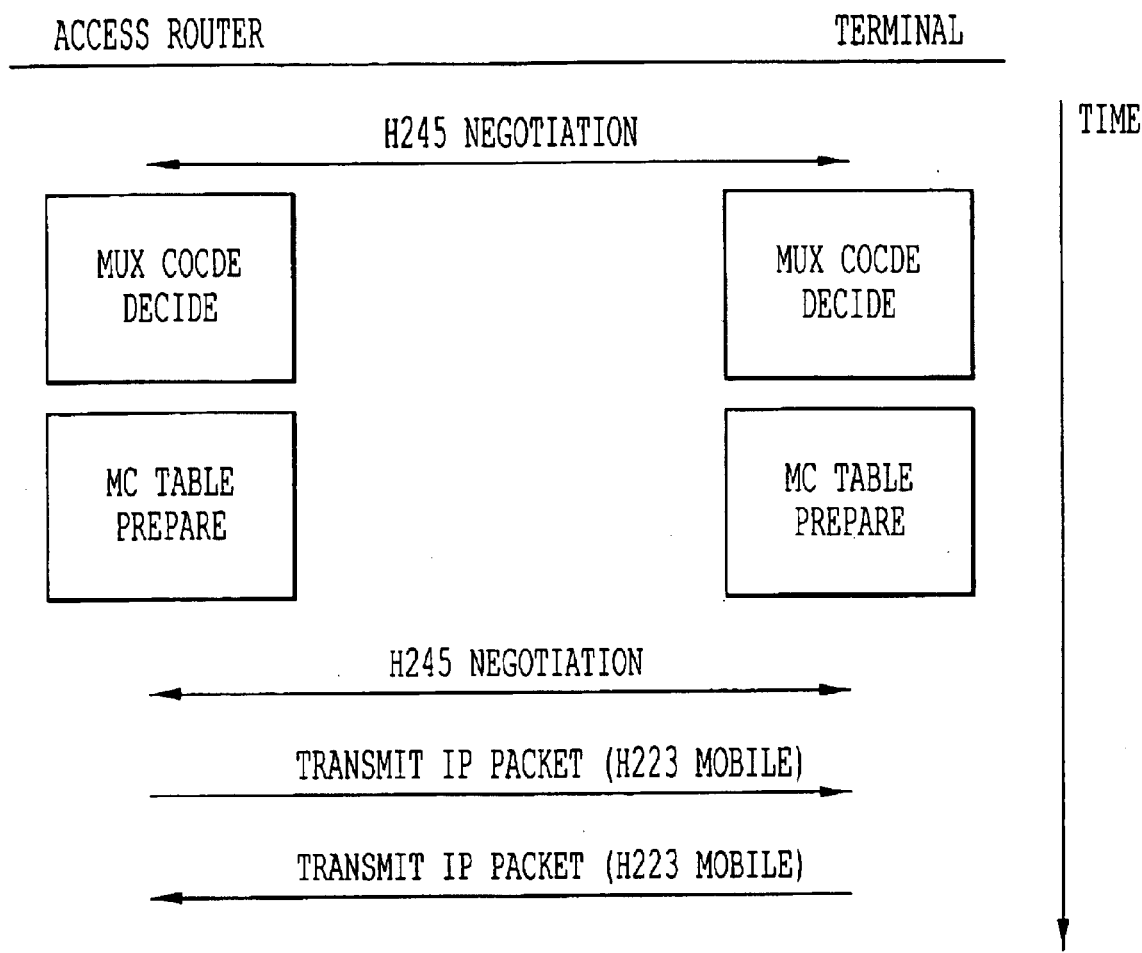
FIG. 14 shows one example of an entire sequence.
FIG. 15 shows one example of an MC table.

FIG. 14 shows one example of an entire sequence of the negotiation between the access router 103 and the terminal 107 according to the second embodiment.

In the first embodiment, as shown in FIG. 6, the type of FEC to be used and other information regarding data are negotiated using separate codes (i.e, the FEC code and the MC code). In this second embodiment, the FEC code is not used, and the value of the MC code, including the type of FEC to be used, is decided during the H.245 negotiation (i.e., what the value of the MC code means is decided through the negotiation). In other words, the negotiation is performed such that both the transmitting and receiving sides can recognize the type of FEC to be used from the MC value. Results of the negotiation are reflected in the MC table shown in, by way of example, in FIG. 15. The MC table is held in both nodes, i.e., the access router 103 and the terminal 107.

It is negotiated, for example, that in the case of MC=1 and MC=2, data that have different attributes (DATA 1 for MC=1 and DATA 2 for MC=2) are exchanged, and that in the case of MC=1, FEC1 is used as the FEC scheme and in the case of MC=2, FEC2 is used as the FEC scheme, respectively. The results are then reflected in the MC table as shown in FIG. 15.

Additionally, as with the first embodiment, FEC1 represents a code with a correction ability capable of substantially completely correcting the error rate of $10^{-3}$ on the radio transmission path, and FEC2 represents a code having a correction ability capable of reducing the error rate of $10^{-3}$ on the radio transmission path down to a limit value of the error resistance of MPEG4, i.e., the error rate of $10^{-4}$.

Figure 16:
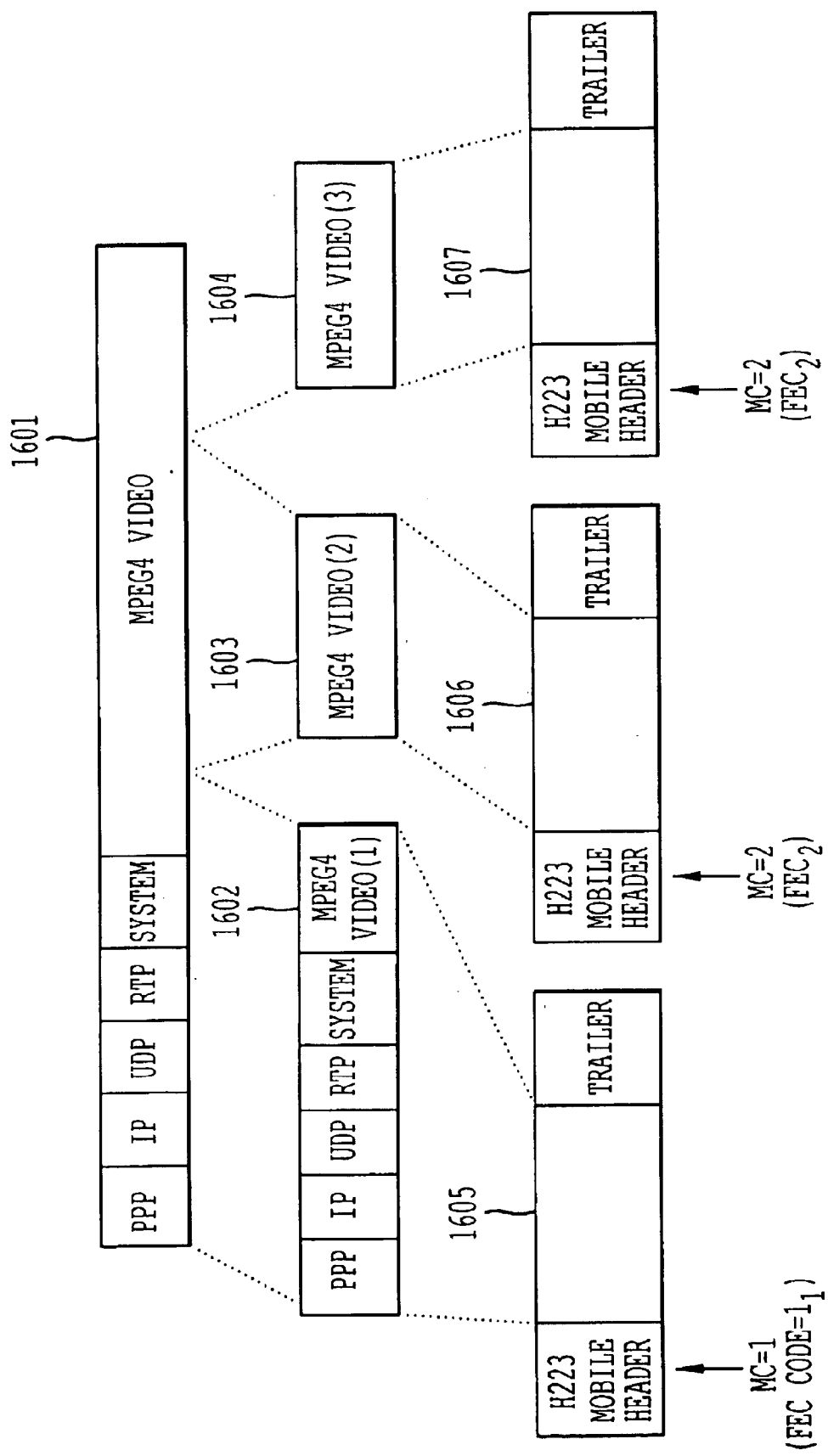
FIG. 16 is a diagram for explaining a process of transforming an MPEG4 packet into an H.223 mobile frame.

One example of a manner of transferring a MPEG4-over-IP packet will be next described with reference to FIG. 16. This manner differs from the manner in the first embodiment, shown in FIG. 9, in that the type of FEC to be used can be ascertained from the MC value. More specifically, as shown at 1605 in FIG. 16, a first fragment 1602 is converted into a frame in accordance with H.223, and FEC1 is employed as the error correction code for the first fragment 1602 because a strong error correction code should be applied. Accordingly, the value of the MUX code is set to 1 in the frame. The frame is then transmitted.

On the other hand, for second and subsequent fragments 1603–1604, FEC2 is employed as the error correction code because the relatively weak error correction code is sufficient to reduce the error rate down to a level corresponding to the error resistance of MPEG4. Accordingly, the value of the MUX code is set to 2 in the frame; thereafter, the frame is transmitted.

The example of FIG. 16 has been described in connection with the case in which the payload of the IP packet is the data having error resistance such as MPEG4 data. As with the first embodiment, however, the second embodiment of the present invention has general applicability to the transfer of IP packets regardless of the attributes of data contained in the payload.

Figure 17:
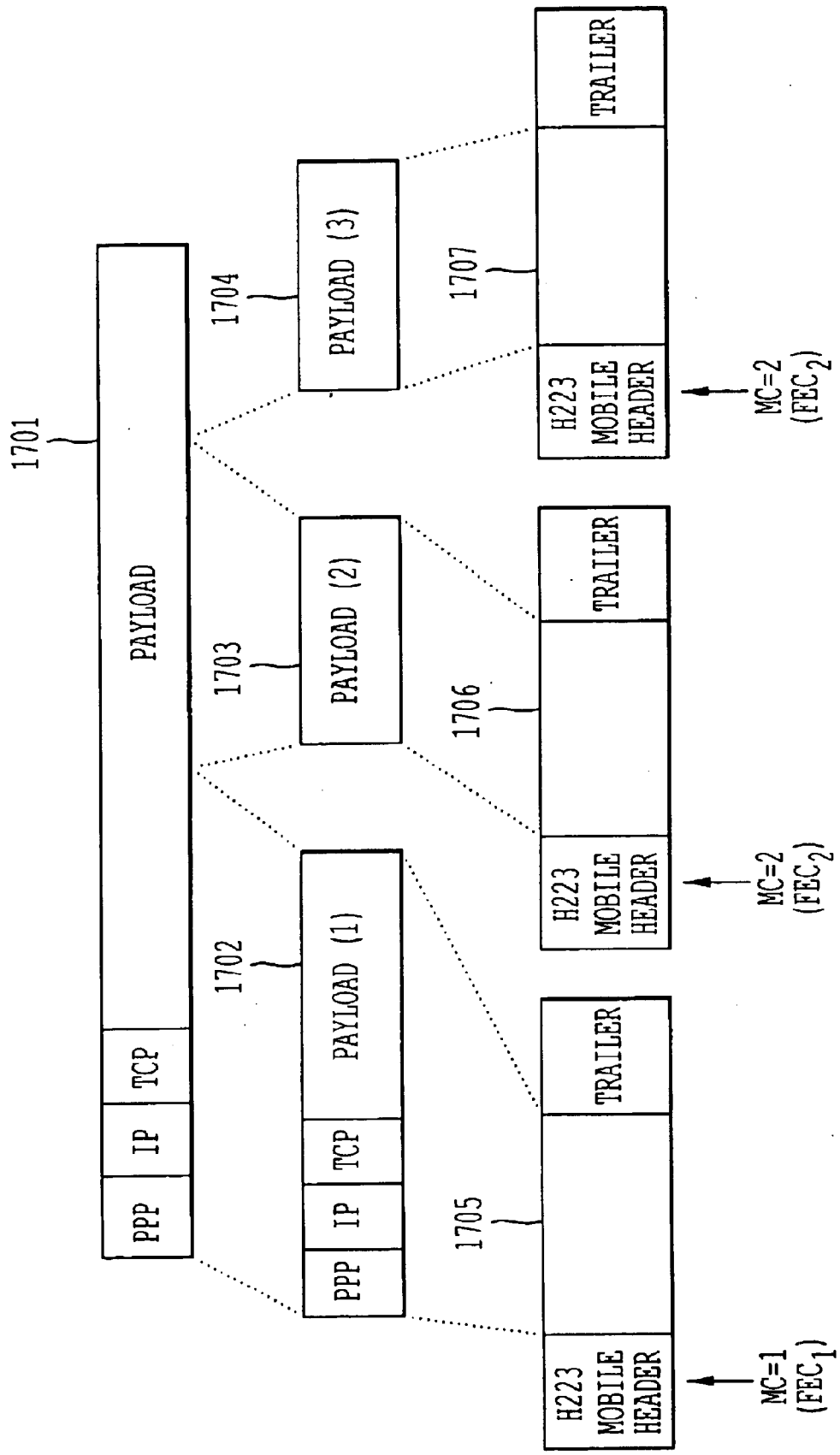
FIG. 17 is a diagram for explaining a process of transforming a general IP packet into an H.223 mobile frame.

FIG. 17 shows an example of the general transfer of IP packets, in which TCP is employed as the transport protocol, according to an embodiment of the present invention. This example differs from the example of the first embodiment, shown in FIG. 10, in that the type of FEC to be used can be ascertained from the MC value in a similar fashion as the FIG. 16. In this case, as with the case of FIG. 16, FEC1 (MC=1) is employed as the error correction code for a first fragment 1702 because a strong error correction code should be applied. On the other hand, second and subsequent fragments 1703 and 1704 are transferred using the relatively weak error correction code FEC2 (MC=2).

The above description has been made of the process executed when the terminal 107 is on the transmitting side. When the terminal 107 is on the receiving side, the process is performed basically in a reversed manner to the process on the transmitting side.

Assuming terminal 107 shown in FIG. 4 receive packets, a frame received by the radio interface unit 1116 in the H.223 mobile processing unit 1101 is first subject to frame synchronization in the frame processing unit 1112.

Then, the FEC scheme to be employed is selected by referring to the MC table 1114 based on the MC code in the received frame. Thereafter, the error correction code is applied to each frame. In the example of FIG. 15, when the MC code=1 holds in the received frame, it is understood that the FEC scheme to be employed is FEC1. The frame for which the error correction has not been completely performed is discarded.

Having passed the error correction process, the fragments are taken out of the frame and are transferred to the fragment processing unit 1111, where the fragments are assembled to form the original packet. This packet is subject to the PPP process and IP process in the IP/PPP processing unit 1102. After successively passing the UDP process in the UDP processing unit 1104, the REP process in the RTP processing unit 1105, and the system process in the system/multiplex processing unit 1106, the packet is MPEG4-decoded in the MPEG4 audio processing unit 1107 and/or the MPEG4 video processing unit 1108. The decoded data is then transferred to an application, for example.

In this second embodiment, as with the first embodiment, the error control scheme may also be changed depending on the attributes of a packet at the higher-level layer, the port number, etc. As a mechanism for implementing this process, the flow/error control correspondence table 1117 is likewise prepared in the frame processing unit 1112 as shown in FIG. 12, by way of example, to specify the error control scheme to be employed for each higher-level layer protocol of a passing packet, or for each passing IP flow. When transmitting a packet in the form of divided fragments to a network, one exemplary method involves the frame processing unit 1112 receiving the attributes of the packet (i.e., information regarding the higher-level layer protocol or flow; for example, by referring to the protocol type field in the IP packet) from the fragment processing unit 1111, and deciding the error control scheme to applied to each of the fragments by referring to the flow/error control correspondence table 1117 of FIG. 12 based on the received information.

While the internal configuration of the terminal 107 has been described so far, it is apparent that the access router 103 may also have a similar internal configuration.

While the embodiments have been described primarily in connection with the case of transferring the MPEG4 video and the MPEG4 audio as data obtained with the coding technique having high "error resistance", the present invention is also applicable to the case of transferring data obtained with any other coding technique having high "error resistance".

It is to be noted that the functions described above can also be realized in the form of software.

Further, the embodiments can also be implemented in the form of a computer-readable recording medium, which records thereon a program for rendering a computer to execute predetermined sequences (or rendering a computer to function as predetermined means, or rendering a computer to realize predetermined functions).

The present invention is not limited to the above-described embodiments, but can be implemented in various modified forms without departing from the technical scope of the invention.

With the present invention, when a header portion and a payload portion of a packet to be transmitted have different error resistance characteristics, the packet can be transmitted to a network under selection of error correction schemes suitable for the respective error resistance characteristics.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A communication node comprising:
  means for dividing a packet to be transmitted into segments to form a plurality of packet segments;
  means for selecting an error correction scheme, from among a plurality of error correction schemes to be employed, for each of the packet segments in accordance with error resistance of each of the packet segments, the error resistance being determined at least by the content of each packet segment;
  means for carrying out an error correction process on each packet segment with the selected error correction scheme; and
  means for transmitting each processed packet segment to a network,
  wherein the selecting means determines the error correction scheme by referring to a port number in said packet.

2. A communication node according to claim 1, further comprising:
- means for negotiating with another communication node connected to the network, prior to transferring the plurality of packet segments, the error correction scheme to be employed in relation to particular packet segments.

3. A communication node according to claim 1, wherein each of said plurality of packet segments has a field identifying the selected error correction scheme, and
- said communication node further comprises means for identifying, in said field, said information corresponding to the selected error correction scheme.

4. A communication node according to claim 1, wherein each of said plurality of packet segments has a field identifying the selected error correction scheme, and
- said communication node further comprises means for negotiating with another communication node connected to the network, prior to transferring the plurality of packet segments, the error correction scheme to be employed in relation to particular packet segments.

5. A communication node according to claim 1, wherein the error correction scheme employed for a particular one of said packet segments has a higher correction ability than another error correction scheme employed for the other packet segments.

6. A communication node according to claim 1, wherein the selecting means determines the error correction scheme by referring to a higher-level protocol field of said packet.

7. A packet transferring method comprising the steps of:
- dividing a packet to be transmitted into segments to form a plurality of packet segments;
- determining an error resistance of each of the packet segments at least by the content of each packet segment;
- selecting an error correction scheme from among a plurality of error correction schemes to be employed for each of the packet segments in accordance with the error resistance of each of the packet segments;
- carrying out an error correction process on each packet segment with the selected error correction scheme; and
- transmitting each processed packet segment to a network,
- wherein the error correction scheme is selected by referring to a port number in said packet.

8. A packet transferring method according to claim 7, further comprising:
- receiving the packet segments from the network;
- determining the selected error correction scheme from the plurality of error correction schemes to be employed for each of the received packet segments based on predetermined information contained in each received packet segment;
- carrying out an error correction process on each received packet segment with the selected error correction scheme; and
- forming the packet from the plurality of processed packet segments.

* * * * *